Jan. 19, 1932.    H. A. BOYER    1,842,066
TANK VALVE
Filed July 11, 1930    2 Sheets-Sheet 1
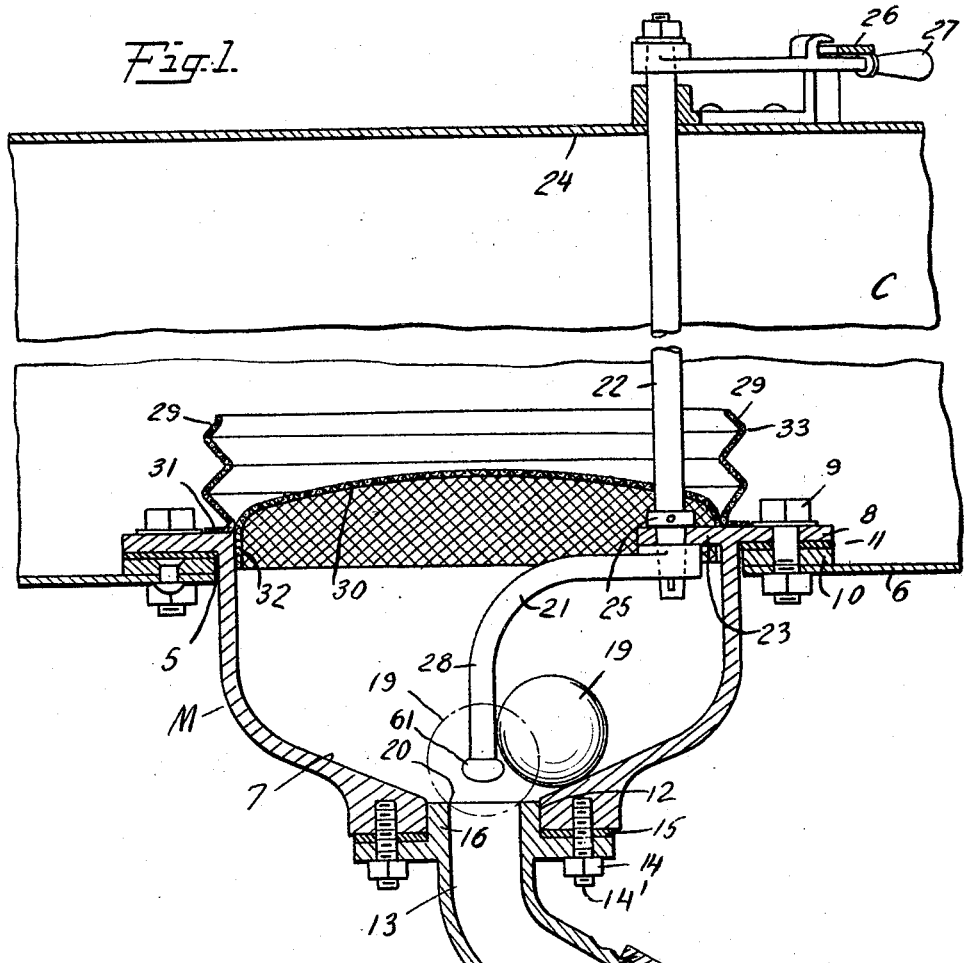
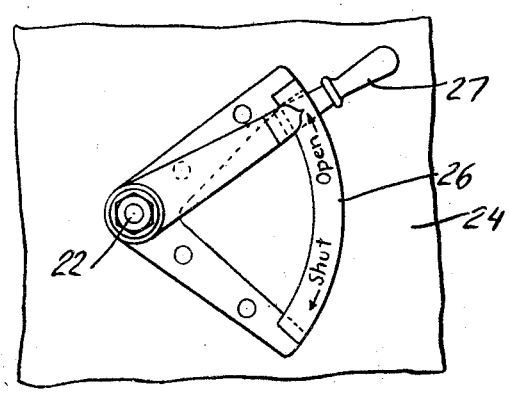
INVENTOR
Howard A. Boyer
BY
Pennie, Davis, Marvin & Edmonds
HIS ATTORNEYS Jan. 19, 1932.  H. A. BOYER  1,842,066
TANK VALVE
Filed July 11, 1930   2 Sheets-Sheet 2
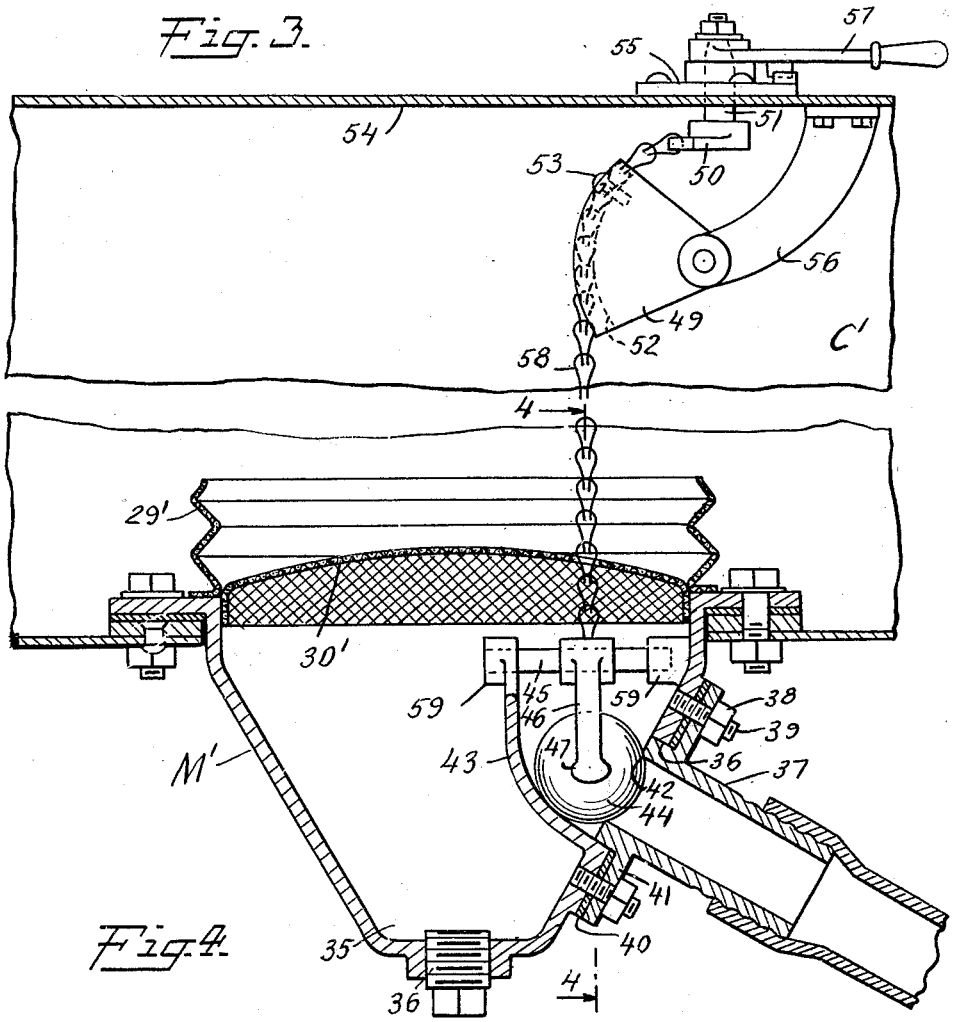
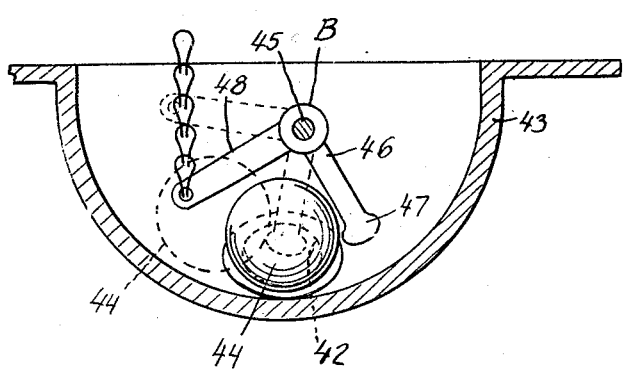
INVENTOR
Howard A. Boyer
BY
Pennie, Davis, Marvin & Edmonds
HIS ATTORNEYS Patented Jan. 19, 1932

1,842,066

UNITED STATES PATENT OFFICE

HOWARD A. BOYER, OF BLOOMFIELD, NEW JERSEY

TANK VALVE

Application filed July 11, 1930. Serial No. 467,182.

This invention relates to valves and more particularly concerns an improved and simplified valve structure for use in controlling the flow of liquid from tanks, pipes or other containers.

In controlling the flow of liquid from tanks, reservoirs or other storage chambers, considerable difficulty has been encountered with the valves heretofore employed due to the clogging or jamming of the operating parts thereof or the obstruction of the liquid passages therethrough by sediment or solid bodies which collect in the liquid containers or pipes. Thus, for example, a considerable amount of foreign matter, such as rust flakes, cinders, leaves, waste, etc., collects in the water tanks of locomotive tenders and the valves controlling the outlet pipes of such tanks frequently become clogged and the operating mechanism thereof jammed by such material.

It is an object of the present invention to provide an improved outlet valve for tanks, pipes and other liquid containers, which valve is extremely simple in construction and reliable in operation. More specifically, it is proposed to provide an outlet valve so constructed as to present a fully open and unobstructed outlet passage when in the open position whereby solid bodies may be washed through the valve with the liquid and the clogging of the valve opening effectively prevented. It is a further object of the invention to provide a valve of the type described incorporating simple and reliable operating means capable of quickly opening or closing the valve, the operating means being constructed and arranged to prevent the obstruction of the liquid passage through the valve thereby and to minimize the collection of foreign bodies thereon. The invention further contemplates the provision of improved screening and sediment-collecting means for the valve structure.

In general, the objects of my invention are carried out by providing a downwardly tapered valve chamber having an outlet opening adjacent the lower end thereof and a spherical valve member or ball for cooperation with the outlet opening to control the flow of liquid therethrough. The valve member is non-buoyant and is moved by gravity and by the flow of liquid into cooperation with the outlet opening to close the valve. The valve operating means includes a member for moving the valve ball to a position clear of the outlet opening whereby an unobstructed passage for the flow of liquid is provided, and the ball moving member is preferably so constructed that it does not obstruct the free and direct passage of liquid through the outlet opening when in the valve opening position. In one embodiment of the invention, I prefer to provide a mud well or sediment chamber adjacent the valve chamber whereby solid bodies may be collected and removed from the container to which the valve is attached.

In certain cases, improved screening means are provided for preventing the entrance of solids to the valve chamber, and I prefer to employ for this purpose a screen including a vertical cylindrical portion surrounding the entrance to the valve chamber and having baffle means on the outer walls thereof to prevent the drifting of solid bodies into the valve chamber, as hereinafter explained in detail.

The invention will be best understood by reference to the accompanying drawings in which certain embodiments thereof have been illustrated.

In the drawings;

Figure 1 is a sectional side view of one embodiment of my improved valve applied to a water tank;

Fig. 2 is a plan view of the operating handle of the valve mechanism shown in Fig. 1;

Fig. 3 is a sectional side view, similar to Fig. 1, showing a modified form of my valve construction incorporating a sediment well; and Fig. 4 is a sectional view, taken along the line 4—4 of Fig. 3 and viewed in the direction of the arrows.

Referring to the drawings, and more particularly to Fig. 1, the disclosed embodiment of my improved valve is shown secured in an opening 5 in the floor plate 6 of a tank or container C. In the particular application disclosed, the tank C represents the water tank of a locomotive tender but my invention is not limited to the use of the valve in a tank of this type.

The valve structure includes a well or casing member M having a downwardly tapered bottom wall 7, as shown. The well member M may be formed integral with the floor plate 6 of the tank or may be secured in the opening 5 therein in any suitable manner. As shown, an outwardly extending flange 8 is provided around the upper edge of the member M and is clamped by suitable means, such as the bolts 9, to the floor plate 6 adjacent the opening 5. A reinforcing ring 10 is preferably riveted or otherwise suitably secured to the inner surface of the floor plate 6 about the opening 5, and the lower surface of the flange 8 is clamped to this ring, a gasket 11 being employed between these parts to insure a liquid-tight joint.

The lower apex of the casing member M has an outlet opening 12 therethrough, and an outlet fitting 13 is secured to this opening by suitable means, such as the nuts 14 on the studs 14', a gasket 15 being employed to insure a tight joint. The fitting 13 has an inwardly directed circular neck or nipple 16 which extends within the opening 12 to a point adjacent the inner edge of this opening. The upper end of the neck 16 forms the seat 20 of the valve. In the disclosed embodiment, the outlet fitting 13 includes an elbow portion 17, to the lower end of which a hose 18 or other liquid conduit may be secured.

The closure member of my improved valve construction preferably comprises a spherical valve ball or plug 19 disposed within the casing member M. The ball 19 is non-buoyant in the liquid handled by the valve, and may be formed of solid rubber or may comprise a hollow metal ball having a rubber coating. The ball 19 is of such a diameter that it rests and seats upon the valve seat 20 formed by the circular opening in the upper end of the neck 16 of the outlet fitting 13, and so prevents the flow of liquid from the tank through this fitting. The ball 19 is, however, smaller in diameter than the opening 12 in the casing member M. With this construction, the ball 19 may be readily removed from the valve structure for inspection or replacement by removing the fitting 13 from the opening 12. The valve operating mechanism preferably includes a member capable of displacing the ball 19 from its closed position on the valve seat. In the disclosed embodiment an operating arm 21 is employed for this purpose and is fixed to and carried by a vertical operating rod 22. The rod 22 is preferably journaled in an opening formed in a lateral support 23 which is integral with the casing member M, and the upper end of the rod is journaled in an aligned opening in the top plate 24 of the tank C. A collar 25 may be fixed to the rod 22 in a position to bear against the upper surface of the support 23 and thereby support the rod and the arm 21. A quadrant 26 is preferably secured to the upper surface of the top plate 24 and a valve operating lever 27 is suitably fixed to the upper end of the operating rod 22 and is arranged to travel over the quadrant as shown in Figs. 1 and 2.

The valve operating arm 21 preferably has a substantially vertically disposed ball engaging portion 28 which may be swung to a position in substantial axial alignment with the valve seat neck 16. An enlargement 61 is preferably formed on the lower extremity of the ball engaging arm 28 to assist in prying the ball 19 from the seat 20. When the operating lever 27 is moved to the open position, the ball engaging portion 28 of the arm 21 rolls the ball 19 off of the seat 20 and out of the path of the liquid stream through the neck 16, leaving a large and unobstructed opening for the flow of liquid from the tank. When the operating handle 27 is moved to the valve closing position, the ball engaging portion 28 of the arm 21 is moved away from the valve seat 20 and the ball 19 rolls by gravity into engagement with the seat 20, as shown in broken lines in Fig. 1. It will be noted that when the valve is in the open position, the ball engaging portion of the operating arm is directed toward the axis of the liquid stream passing into the outlet fitting 13, and accordingly, solid bodies, such as waste, rags, leaves, etc., are washed directly through the opening and are not retained by the arm 21 in a position to clog the valve. Further, no ridges, ledges or pockets are presented in the path of the liquid stream through the valve, and accordingly, the collection of sediment or solid bodies in a position to clog or obstruct the valve is effectively prevented.

As explained above, I prefer in certain cases, to employ an improved screening device in connection with my valve structure. As shown in Fig. 1, this device comprises a substantially cylindrical screen 29 which rests on the flange 8 of the casing member M and surrounds the upper opening of this member. A horizontal screen 30 preferably extends across the vertical screen 29 adjacent the lower end thereof, and the two screens 29 and 30 may be welded or otherwise suitably secured together. The lower edge of the screen 29 is preferably bent outwardly to form a horizontal flange 31 which rests on the flange 8, and the outer edge of the screen 30 is preferably bent downwardly to form a cylindrical portion which fits snugly within the upper open end of the casing member M. With this arrangement, the screening device may be easily removed from the valve structure for cleaning or replacement.

The screen 29 acts as a barrier to restrain non-buoyant sediment or solid bodies which collect at the bottom of the tank C and prevent the flow of such bodies into the casing member M. In order to prevent solid bodies from being washed or sucked up along the outer surface of the screen 29 and into the upper open end thereof, I prefer to provide baffles or extensions on the outer surface of this screen. This may be conveniently accomplished by corrugating the screen 29 and thus forming a plurality of outwardly extending ridges 33, as shown. A large proportion of the solids which collect in tanks such, for example, as the water tanks of locomotive tenders, is of non-buoyant nature and so settles to the floor plate of the tank. When the valve is opened and liquid is flowing from the tank, horizontal currents are created along the tank floor adjacent the valve and sediment and solid bodies are drawn toward the valve. The cylindrical screen 29 with its ridges 33 stops these non-buoyant solids and so to a large extent prevents the clogging of the horizontal screen 30. Such solids as may be washed over the top of the screen 29 and also the solids suspended in the water are caught and retained by the horizontal screen 30.

Referring now more particularly to the modification of the invention shown in Fig. 3, the downwardly tapered casing member M' is provided with a mud well or sediment receptacle 35 at the lower end thereof. A plug 36 is threaded into an opening in the lower apex of the casing member M' to permit the periodic removal of such sediment, grit and other solids as may pass through the screen 30' and collect in the well 35. The liquid outlet opening 36 of the casing member M' is formed in the side wall of the casing as shown, and an outlet fitting 37 is fixed to this opening by suitable means such as the nuts 38 and studs 39, a gasket 40 being interposed between the flange 41 of the fitting and the surface of the casing M' to insure a liquid-tight joint. The neck of the outlet fitting 37 extends within the opening 36 to a point substantially flush with the inner surface of the casing M' and the inner end 42 of this neck forms the seat of the valve. A curved pocket 43 is formed integral with or suitably secured to the inner surface of the casing member M' about the opening 36. As shown in Figs. 3 and 4, the pocket 43 is open at the top and has downwardly sloping side walls which extend just below the lower edge of the outlet opening 36. The valve closing ball 44 is carried within the pocket 43, and when released by its operating mechanism, this ball is moved by gravity to the bottom of the pocket and seats upon and closes the inner end of the outlet fitting 37. The ball 44 is of smaller diameter than the opening 36 so that when the outlet fitting 37 is removed, the ball 44 may be withdrawn through this opening.

Referring now to the operating mechanism of the modification of my valve construction shown in Figs. 3 and 4, a bell crank lever B is pivotally supported over the pocket 43 on the shaft 45. The shaft 45 is journaled to turn freely in suitable fittings 59 formed integral with the wall of the casing member M' and the wall of the pocket 43, and the bell crank lever B is preferably free to turn on the shaft 45 as well. The ball engaging arm 46 of the bell crank lever B preferably has an integral enlargement 47 on the lower end thereof to assist in prying or lifting the ball 44 from its seat 42 against the pressure of the liquid in the tank. An operating chain 58 is secured to the arm 48 of the bell crank lever B and this chain extends upwardly through an opening in the screen 30' over a pivotally mounted sector 49 and is fixed to the end of an arm 50 which is attached to a vertical shaft 51. The sector 49 is pivotally supported on a bracket 56 which may be fixed to the tank wall or top plate 54 in any suitable manner. The sector 49 is provided with a groove 52 on the arcuate surface thereof for the reception of the chain 58, and the chain is preferably fixed to the sector by suitable means, such as the machine screws 53. The vertical shaft 51 passes through an opening in the top plate 54 of the tank C' and is journaled in a quadrant plate 55. An operating lever 57 is fixed to the upper end of the shaft 51. In the modification of Fig. 3 as well as in the valve shown in Fig. 1, all of the moving parts of the valve operating mechanism are preferably formed of a metal which is not attacked or appreciably corroded by the liquid flowing through the valve.

When the operating lever 57 is moved to the open position, the chain 58 is lifted and the arm 48 of the bell crank lever B is raised, thus moving the ball engaging arm 46 of this lever into contact with the valve ball 44 and rolling the ball up one side of the pocket 43 and out of engagement with the seat 42. As shown in broken lines in Fig. 4, the ball 44 is moved entirely away from the open end of the outlet fitting 37 when the chain 58 is lifted, and an unobstructed passage is provided for the flow of liquid through the valve. When the operating handle 57 is moved to the valve closing position, the chain 58 is lowered, the arm 46 of the bell crank lever moves away from the opening in the fitting 37 and the ball 44 rolls by gravity into contact with the seat 42, thereby preventing the flow of liquid from the tank.

A screen having a vertical portion 29' and a horizontal portion 30' is preferably employed in connection with the modified valve structure of Fig. 3, this screen being similar in construction and operation of the screen 29 and 30 described above in connection with the valve of Fig. 1.

Although the valve of the present invention is capable of general application, it is particularly adapted for use in installations where an extremely reliable normally open valve is required. Thus, the improved features of my valve make it particularly suitable for use in controlling the flow of water from the tanks of railway locomotive tenders. The outlets of locomotive tender water tanks are usually connected by a hose to an injector, water pump or other suitable feed water supply device on the locomotive proper. When the locomotive is in use, the flow of water through this hose from the tender tank should be uninterrupted, as a failure of the feed water supply prevents the further operation of the locomotive. When the tender is uncoupled from the locomotive proper, or when repairs or replacements are made on the feed water supply equipment, the water hose between the tender tank and the locomotive is disconnected and a valve at the water tank outlet must be closed to prevent the loss of water from the tank. Tender tanks are necessarily somewhat exposed and solid bodies, such as leaves, cinders, coal dust, waste, etc., collect therein in comparatively large quantities.

When the valve structure of the present invention is employed to control the outlet of a locomotive tender water tank, the valve is normally in the open position and a direct and unobstructed passage is provided for the free flow of water to the locomotive feed water supply apparatus. Non-buoyant solids, such as leaves, waste, etc., are prevented from entering the valve chamber by the vertical cylindrical screen, and the clogging of the horizontal screen by such solids is avoided. Most of the fine solids in suspension in water are retained by the horizontal screen. When the type of valve shown in Fig. 3 is employed, any solids which pass through the screen 30' collect in the well 35 and may be periodically removed. Any foreign bodies which find their way into the valve casing are carried through the outlet fitting by the flow of water therethrough and accordingly do not remain to obstruct the valve seat. The arrangement of the valve ball operating arm is such that this arm is substantially aligned with the liquid stream passing through the valve when in the open position, and accordingly, solid bodies are not caught and retained by the arm.

Although an unobstructed liquid passage is provided when the valve is open, the valve may be quickly closed, and the operation thereof, even after long periods of disuse, is extremely reliable. The reliability of operation of my valve is largely due to the simplicity of construction thereof. If a foreign body should hold the ball off of its seat when in the closed position, the manipulation of the operating handle toward the open position permits a rapid spurt of water through the valve outlet and thus flushes out the obstructing matter and permits the ball to seat tightly when again released.

The screening device is so constructed and mounted that it may be readily lifted out of the tank for cleaning, replacement or repair. Also, the valve ball may be readily removed for inspection or replacement by simply removing the outlet fitting, which operation also exposes the valve seat for inspection or replacement. With the outlet fitting removed, the ball is forced out of the outlet opening by gravity or by any water which may remain in the tank.

I claim:

1. A valve mechanism comprising in combination a valve casing having an outlet opening therein, said casing having walls converging downwardly toward said opening, a valve ball within said casing movable by gravity along said walls into seating engagement with said opening, a valve operating device including an elongated arm separate from said ball and movable laterally into a position over but spaced from said opening to displace said ball from said opening and open the valve, said arm being directed toward and substantially aligned with said opening when the valve is open.

2. A valve comprising in combination a casing having a sediment well at the bottom thereof, a downwardly tapered valve pocket within said casing above said sediment well, said casing having an outlet opening within and adjacent the lower apex of said pocket, a valve ball within said valve pocket and movable by gravity into seating engagement with said outlet opening and means for moving said ball out of engagement with said outlet opening to open the valve.

3. A valve comprising in combination a casing having downwardly inclined side walls forming a sediment well, a removable closure at the lower apex of said sediment well, a downwardly converging valve pocket within said valve casing on one of the side walls thereof above the lower apex of said sediment well, said casing having an outlet opening within and adjacent the lower end of said pocket, a valve ball within said pocket and movable by gravity into seating engagement with said outlet opening to close the valve and means for moving said ball out of engagement with said outlet opening to open the valve.

4. A valve comprising in combination a casing having a sediment well at the base thereof, a downwardly converging valve pocket within said casing above said sediment well, said casing having an outlet opening within and adjacent the lower end of said pocket, a valve seat having an opening therethrough removably secured within said outlet opening, a valve ball within said pocket movable by gravity into seating engagement with the opening in said valve seat, said ball having a diameter larger than that of the valve seat opening and smaller than that of said outlet opening, whereby said ball may be removed from said casing through said outlet opening when said seat is removed, and means for moving said ball away from said seat to open said valve.

5. In a device of the type described, a valve casing having an inlet opening, valve means for controlling the flow of liquid from said casing, a substantially cylindrical screen surrounding said inlet opening and outwardly extending baffles on said screen.

6. In a valve for controlling the flow of liquid from a tank, in combination with a tank having a floor plate with an opening therein, a valve casing having an open upper inlet end fixed to the opening in said floor plate, means for controlling the flow of liquid from said valve casing, an upwardly extending screen surrounding the inlet opening of said valve casing and a plurality of outwardly extending ridges on the outer surface of said screen.

7. In a valve for controlling the flow of liquid from a tank, in combination with a tank having a floor plate with an opening therein, a valve casing having an open upper inlet end fixed to the opening in said floor plate, means for controlling the flow of liquid from said valve casing, an upwardly extending substantially cylindrical screen within the tank surrounding the inlet opening of said valve casing, and a horizontal screen extending across the said substantially cylindrical screen adjacent its lower end.

8. In a valve for controlling the flow of liquid from a tank, in combination with a tank having a floor plate with an opening therein, a valve casing having an open upper inlet end fixed to the opening in said floor plate, means for controlling the flow of liquid from said valve casing, an outwardly extending substantially cylindrical screen within the tank surrounding the inlet opening of said valve casing, a plurality of substantially circular outwardly extending ridges on the outer surface of said screen and a substantially horizontal screen extending across the lower end of the substantially cylindrical screen.

In testimony whereof, I affix my signature.

HOWARD A. BOYER.